(No Model.)

W. M. SEARBY.
Bed Pan.

No. 234,076.                                   Patented Nov. 2, 1880.

Witnesses:
John L. Boone
Wm. H. Clark

Inventor:
William M. Searby
per Boone & Osborn,
Attys.

UNITED STATES PATENT OFFICE.

WILLIAM M. SEARBY, OF SAN FRANCISCO, CALIFORNIA.

BED-PAN.

SPECIFICATION forming part of Letters Patent No. 234,076, dated November 2, 1880.

Application filed April 1, 1880. (No model.)

*To all whom it may concern:*

Be it known that I, WILLIAM M. SEARBY, of the city and county of San Francisco, in the State of California, have invented certain new and useful Improvements in Bed-Pans; and I do hereby declare that the following is a full, clear, and exact description thereof, reference being had to the accompanying drawings.

The object of my invention is to render sheet-metal bed-pans more convenient and better adapted to prevent the bed-clothes from becoming soiled while the pan is being used; and to this end it consists in a novel manner of constructing the pan and forming its top, as hereinafter described.

Figure 1:
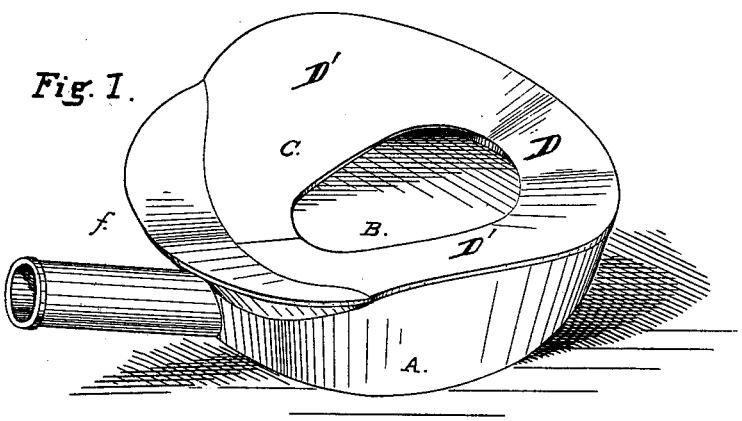
Figure 2:
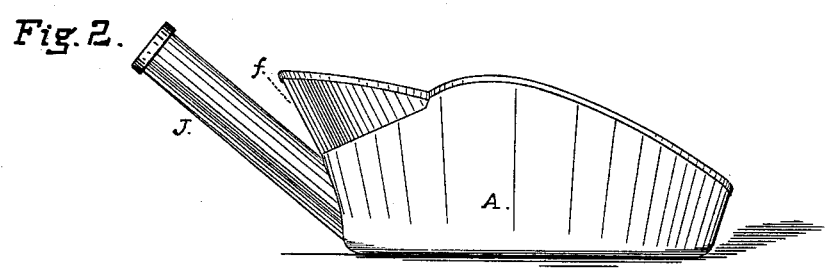
Figure 3:
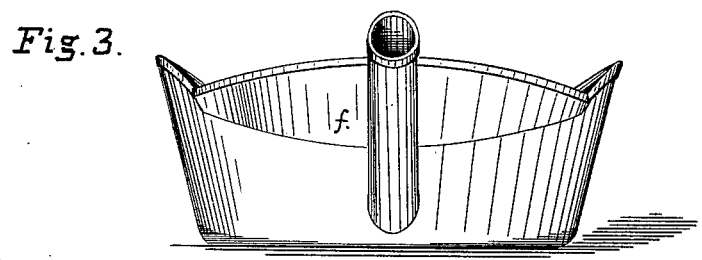

Referring to the accompanying drawings, Figure 1 is a perspective view of my improved bed-pan. Fig. 2 is a side elevation. Fig. 3 is a front view of the same.

A represents the body of the pan. The bottom and sides of the pan can be formed of a single piece of sheet metal by spinning or pressing it into the proper shape, or it can be made of several pieces seamed together. I prefer the former plan, as it gives a smoother inside surface, that is easily cleaned and dried and is not so liable to rust.

The top C, which has a central opening, B, is formed with a concavity extending from said opening to its rear edge, as at D, while on the sides of said opening it is inclined from the side edges downwardly to said opening, as at D' D'. The outer edge of the top of the pan gradually rises from a lower cut surface opposite the rear edge of the concavity D toward and at the sides of the pan, so as to provide an enlarged concavity that will fit the person.

The edge opposite the hollow I make to stand outward by cutting out of the edge a concave piece and then inserting a visor-shaped piece, *f*, to fit. This visor-shaped piece is made quite full, and is inserted at an angle to the side, so as to stand outward. The top is extended out to meet the edge of this visor-shaped piece, a similar visor-shaped piece being inserted, if found necessary, to give the proper shape.

The tubular handle J extends from the pan just below the visor-shaped piece *f*, so as to be opposite and in line with the hollow in the top.

The visor-shaped piece gives a flare to that side of the top which comes just in front of the central opening, thus protecting the bed-clothes from becoming soiled. I place a screw-cap over the end of the tubular handle.

By this construction I render sheet-metal bed-pans not only more convenient for the user, but I adapt them so that there is no danger of soiling the bed-clothes.

Having thus described my invention, what I claim, and desire to secure by Letters Patent, is—

The bed-pan A, having its top C provided with a concavity or channel, D, extending from its central opening to its rear edge, inclined downwardly on its sides to said opening, and flared outward from said opening to its front edge, substantially as set forth.

In witness whereof I have hereunto set my hand and seal.

WILLIAM M. SEARBY. [L. S.]

Witnesses:
W. F. J. CLARK,
EDWARD E. OSBORN.